B. C. TAYLOR.
HORSE HAY RAKE.
No. 81,706. Patented Sept. 1, 1868.
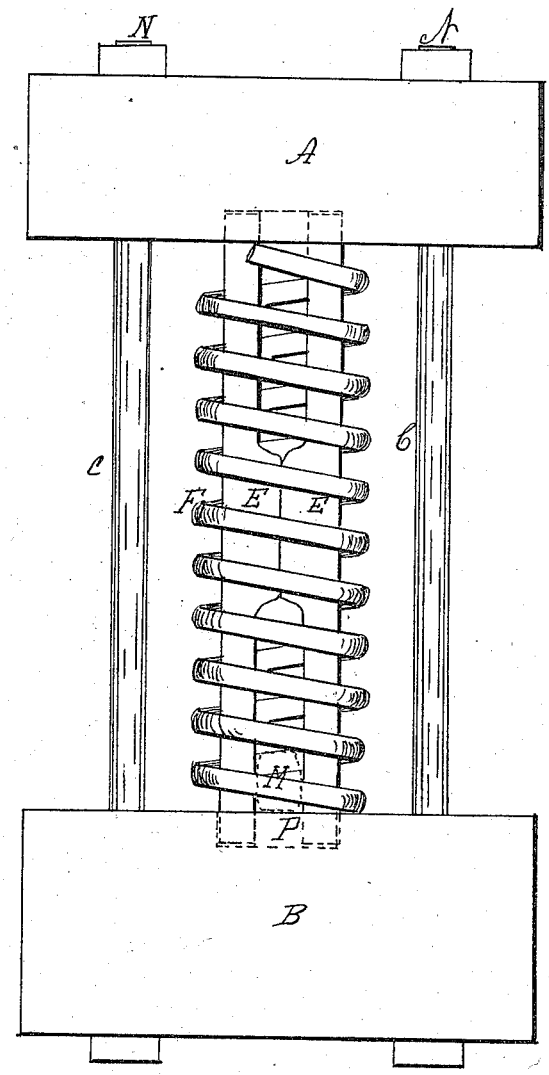

United States Patent Office.

BENJAMIN C. TAYLOR, OF DAYTON, OHIO.

Letters Patent No. 81,706, dated September 1, 1868

IMPROVEMENT IN HORSE HAY-RAKES.

The Schedule referred to in these Letters Patent and making part of the same.

TO ALL WHOM IT MAY CONCERN:

Be it known that I, BENJAMIN C. TAYLOR, of Dayton, in the county of Montgomery, in the State of Ohio, have invented certain new and useful Improvements in Horse-Rakes; and I do hereby declare that the following is a full and exact description thereof, reference being had to the accompanying drawing, and to the letters of reference marked thereon.

The nature of my invention consists in an improved device, to serve as a guide for the teeth in horse-rakes, and a support for the springs which rest upon the teeth.

To enable others skilled in the art to make and use my invention, I will proceed to describe its construction and operation.

The figure represents a side view of the device.

A and B represent sections of rails, which are attached to the frame of a horse-rake. Shallow holes are bored in each of the rails, as shown by dotted lines at P, and into these holes are placed the pieces E E, having the spiral spring F around the same, whilst the bolts C C serve to hold together the several parts. The cast-iron pieces E E are identical in form, and the metal is thin, and each is semicircular in form transversely at the middle, and at the ends are cut away, as shown in the drawing. The tooth M, which is represented by dotted lines, occupies the lower space. The spring holds the tooth against the bar only when some obstruction causes the tooth to rise. Thus it will be seen the pieces E E serve the several purposes, that of a support to the spring, a guide for the tooth, and a stay to the bars, the bolts drawing the bars up firmly against the ends of these pieces, and also prevent the spring from damage, by limiting the movement of the foot.

What I claim as my invention, and desire to secure by Letters Patent, is—

The pieces E E, and their arrangement with reference to the bars A and B, the spring F, and bolts C C, in the manner substantially as described, and for the purposes specified.

BENJAMIN C. TAYLOR.

Witnesses:
GEO. W. HAYS,
B. PICKERING.